(12) United States Patent
Middler et al.

(10) Patent No.: US 7,419,592 B2
(45) Date of Patent: Sep. 2, 2008

(54) DEVICE FOR FILTERING A FLUID ESPECIALLY FOR PLASTIC-PROCESSING INSTALLATIONS

(75) Inventors: Robert Middler, Havixbeck (DE); Stefan Wostmann, Fuchtorf (DE)

(73) Assignee: Kreyenborg Verwaltungen und Beteilgungen GmbH & Co. KG, Munster (DE)

( * ) Notice: Subject to any disclaimer, the term of this patent is extended or adjusted under 35 U.S.C. 154(b) by 398 days.

(21) Appl. No.: 10/496,403

(22) PCT Filed: Jul. 18, 2003

(86) PCT No.: PCT/DE03/02418

§ 371 (c)(1),
(2), (4) Date: May 12, 2004

(87) PCT Pub. No.: WO2004/026432

PCT Pub. Date: Apr. 1, 2004

(65) Prior Publication Data

US 2005/0016914 A1 Jan. 27, 2005

(30) Foreign Application Priority Data

| Sep. 14, 2002 | (DE) | ............................... | 102 42 993 |
| Nov. 20, 2002 | (DE) | ............................... | 102 54 022 |
| Feb. 27, 2003 | (DE) | ............................... | 103 08 429 |
| Apr. 15, 2003 | (DE) | ............................... | 103 17 170 |

(51) Int. Cl.
*B01D 35/16* (2006.01)
(52) U.S. Cl. .................. 210/333.01; 210/341; 210/359; 210/411; 425/197; 425/199
(58) Field of Classification Search ................. 210/340, 210/341, 359, 393, 411, 108, 333.01, 333.1; 425/197–199
See application file for complete search history.

(56) References Cited

U.S. PATENT DOCUMENTS

| 4,701,118 A | * | 10/1987 | Koching et al. | .............. | 425/185 |
| 4,752,386 A | * | 6/1988 | Schulz et al. | ................ | 210/108 |

(Continued)

FOREIGN PATENT DOCUMENTS

DE 35 27 173 9/1986

(Continued)

*Primary Examiner*—Joseph W Drodge
(74) *Attorney, Agent, or Firm*—Merchant & Gould P.C.

(57) ABSTRACT

The invention relates to a device for filtering a fluid, especially a liquefied plastic, said device comprising a housing, a supply channel, a discharge channel and optionally backwash channels. At least two filter elements are arranged in corresponding filter regions in the flow path of the fluid, in a filter carrier which is mounted in such a way that in can be perpendicularly displaced in relation to the direction of flow, said filter elements being able to communication with the supply channel and the discharge channel. Each filter region comprises two supply partial channels which are worked in to the filter carrier or the housing and are oriented away from the filter regions towards the discharge channel. Said discharge channel comprises housing partial channels which flow together to form the discharge channel. The supply channels can communication with the housing partial channels by displacing the filter carrier in such a way as to guide the fluid, and optionally the filter regions can be connected to the backflow channels by displacing the filter carrier.

12 Claims, 14 Drawing Sheets

U.S. PATENT DOCUMENTS

Figure 1:
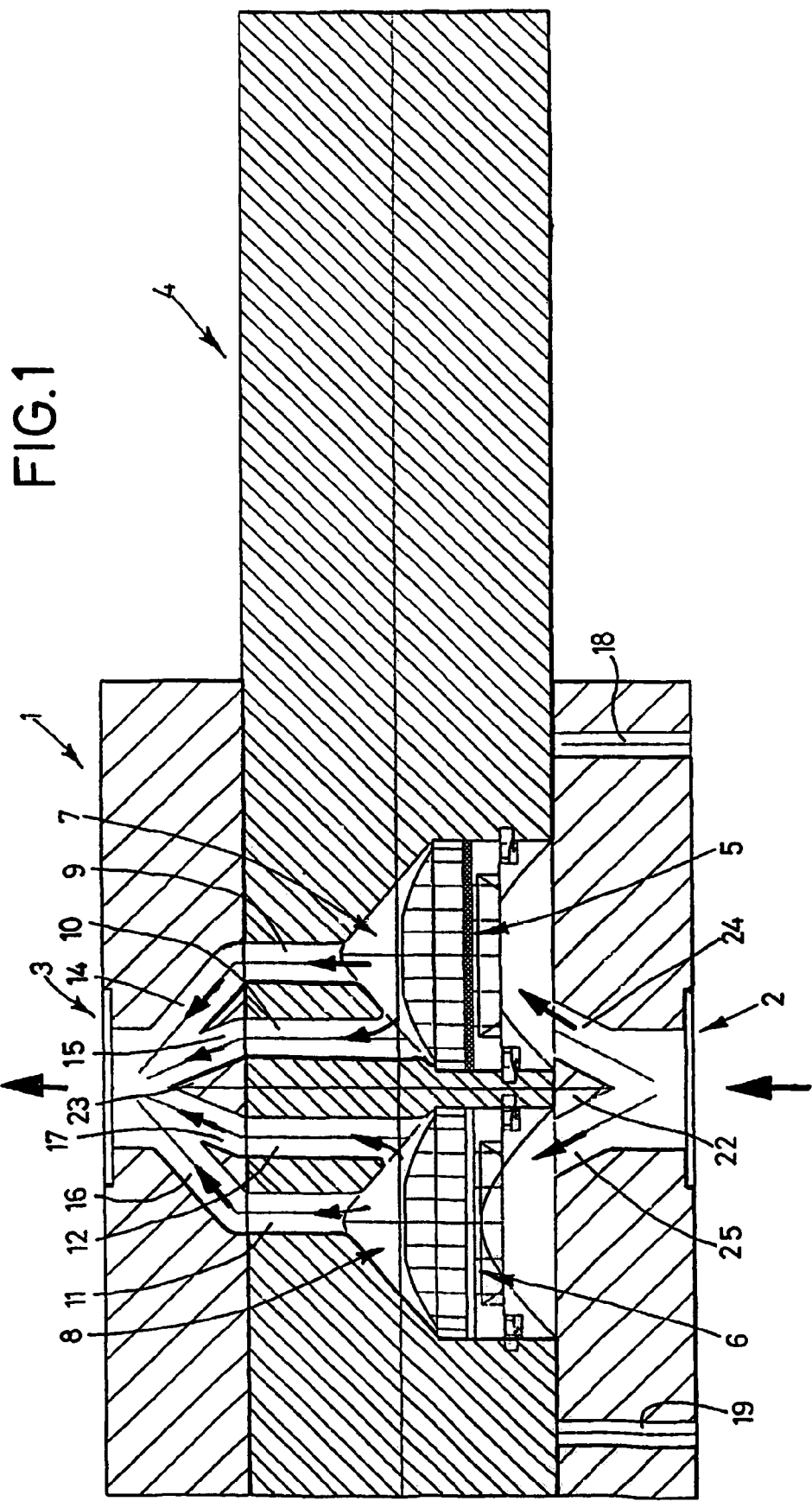

| | | | |
|---|---|---|---|
| 5,032,267 A | * | 7/1991 | Petschner .................. 210/236 |
| 5,417,856 A | * | 5/1995 | Bacher et al. ............ 210/333.1 |
| 5,578,206 A | | 11/1996 | Ogoshi et al. |
| 6,325,217 B1 | * | 12/2001 | Hehenberger et al. ....... 210/411 |
| 6,722,852 B1 | * | 4/2004 | Wedlake et al. ......... 416/223 A |

FOREIGN PATENT DOCUMENTS

| | | |
|---|---|---|
| DE | 195 19 907 | 12/1996 |
| EP | 0 707 878 | 4/1996 |
| EP | 0 798 098 | 10/1997 |

* cited by examiner

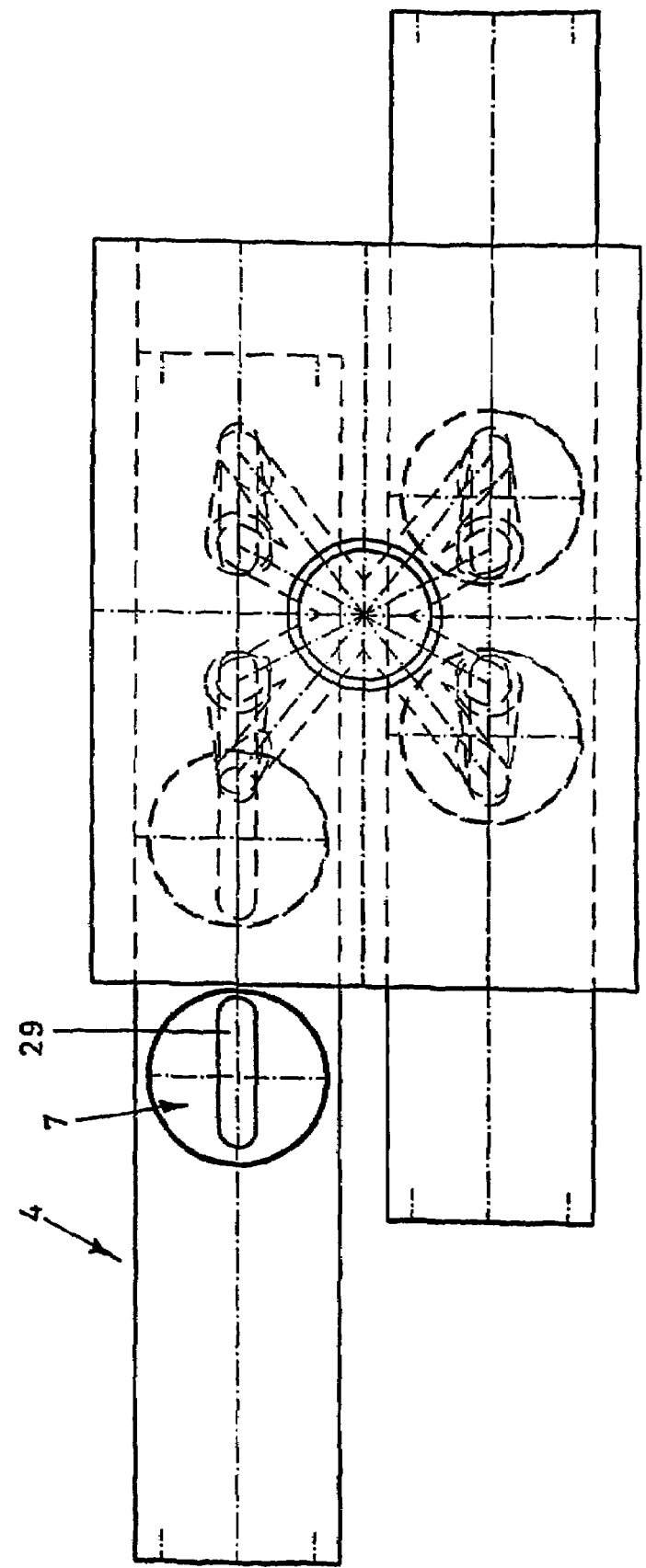

DEVICE FOR FILTERING A FLUID ESPECIALLY FOR PLASTIC-PROCESSING INSTALLATIONS

The invention relates to a device for filtering a fluid, especially a liquefied plastic, according to the preamble of claim 1 and of claim 10.

In the following, the term "filter carrier" is used is connection with the terms "filter" or "filter element"; it should be pointed out that the term "filter" or "filter element" applies to the most varied sieves, filters, and other retaining devices for contaminants.

Devices are known in the prior art, for example from DE 195 19 907 C2 and EP 0 798 098 B1.

In contrast to these known devices, the invention is based on the problem of creating an arrangement wherein the largest possible filter surfaces are achieved simultaneously with the smallest possible filter carrier diameters and filter changer housings. Further, the forming of the channels should be possible in the technically simplest manner and the filter carrier length should be kept as short as possible.

This problem, on which the invention is based, is solved through the teaching of claim 1.

Advantageous embodiments are explained in the dependent claims.

Expressed in other words, it is proposed that the supply channel be divided into at least two partial supply channels that, in the production position, lead to the actual filter regions. After the filters are flowed through, in each filter region two filter-carrier partial channels lead to two housing partial channels, which lead to the discharge channel arranged opposite to the supply channel, the merging of these at least four housing channels to the discharge channel taking place in the wall of the housing.

In such a device, the production position, in which fluid flows through the two filter elements, should be realized while, simultaneously, the filter carrier should be movable such that a replacement of the filter elements in the so-called filter change position is possible.

Through the fact that the filter-carrier partial channels leading from the back side of the filters to the discharge channel are formed in the filter carrier in a substantially rectilinear manner, thus orthogonally with respect to the longitudinal axis of the filter carrier, a relatively small cross section of the filter carrier is possible, the merging of these at least four housing partial channels to the discharge channel taking place in the housing. Here, these channels then run to the discharge channel obliquely with respect to the longitudinal axis of the filter carrier, and the production of these obliquely configured channels can be undertaken in the housing in a considerably easier and simple manner than in the filter carrier itself.

Through the fact that the filter carrier has a relatively small embodiment, the housing can be also be fashioned relatively small, which not only reduces the material expense, but also reduces the energy expense for the constant heating of the arrangement as a whole.

In addition, due to the smaller frictional surface, the displacement of the filter carrier itself requires less force than is the case with an arrangement in which the filter carrier must have a relatively large and long embodiment.

In a preferable embodiment form of the device according to the invention, the supply channel and the merging of the partial housing channels leading to the discharge channel are produced in connection plates that can be connected to the housing, whereby again the device as a whole can be kept relatively small and the processing and production of these different channels can be simplified.

With a device of the type according to the invention in which only a single filter carrier is provided, in the production position a continuous operation is possible, but in the filter change position the production must be interrupted. In order to avoid this, according to a further feature of the invention it is proposed that several filter carriers, thus at least two filter carriers, be provided, by which means, when one filter carrier is displaced into the position in which the filters are changed, the other filter carrier ensures that production still takes place.

In the devices according to the above-mentioned literature (DE 195 19 907 C2 and EP 0 798 098 B1), a flow reversal of the plastic is also possible, this plastic being led back through the other inlet channel of the filter carrier in each case, and thus a backflushing of the filter arranged in this inlet channel can be effected. The backflowing plastic can be discharged through a backflush channel. Likewise, in the above-explained device according to the invention, it is possible to realize not only the production position, in which the two filters are flowed through by fluid, but also the backflush position of one or the other filter while simultaneously the neighboring filter maintains the production.

Further, an essential feature of the arrangement according to the invention is to be seen in the fact that, through displacement of the filter carrier, a filter region can be adjusted such that no connection of this filter region to the supply channel and to the backflush channel exists, yet a connection of this filter region to the filter-carrier partial channels and the housing partial channels of the other filter region can be produced. Through this arrangement, a pressure increase from the back side occurs in the filter region thus blocked, so that the pressure required for the subsequently-intended backflushing of this filter region is prevalent in the filter region.

Finally, according to the invention it is proposed that a so-called flow divider be arranged in the supply channel, which flow divider is provided in front of the two filter regions and thereby forms the supply partial channels. The flow divider effects a good flow toward the filter regions and at the same time prevents a wearing by the onflowing fluid at the dividing crosspiece in the component of the filter carrier bearing the two filters.

In addition, a flow diverter can be provided in the discharge channel, which diverter contributes to the formation of the housing partial channels and prevents a dead space in the region of the housing partial channels and of the discharge channel, which dead space could lead to a molecular cracking of the product possibly being deposited there.

Figure 3:
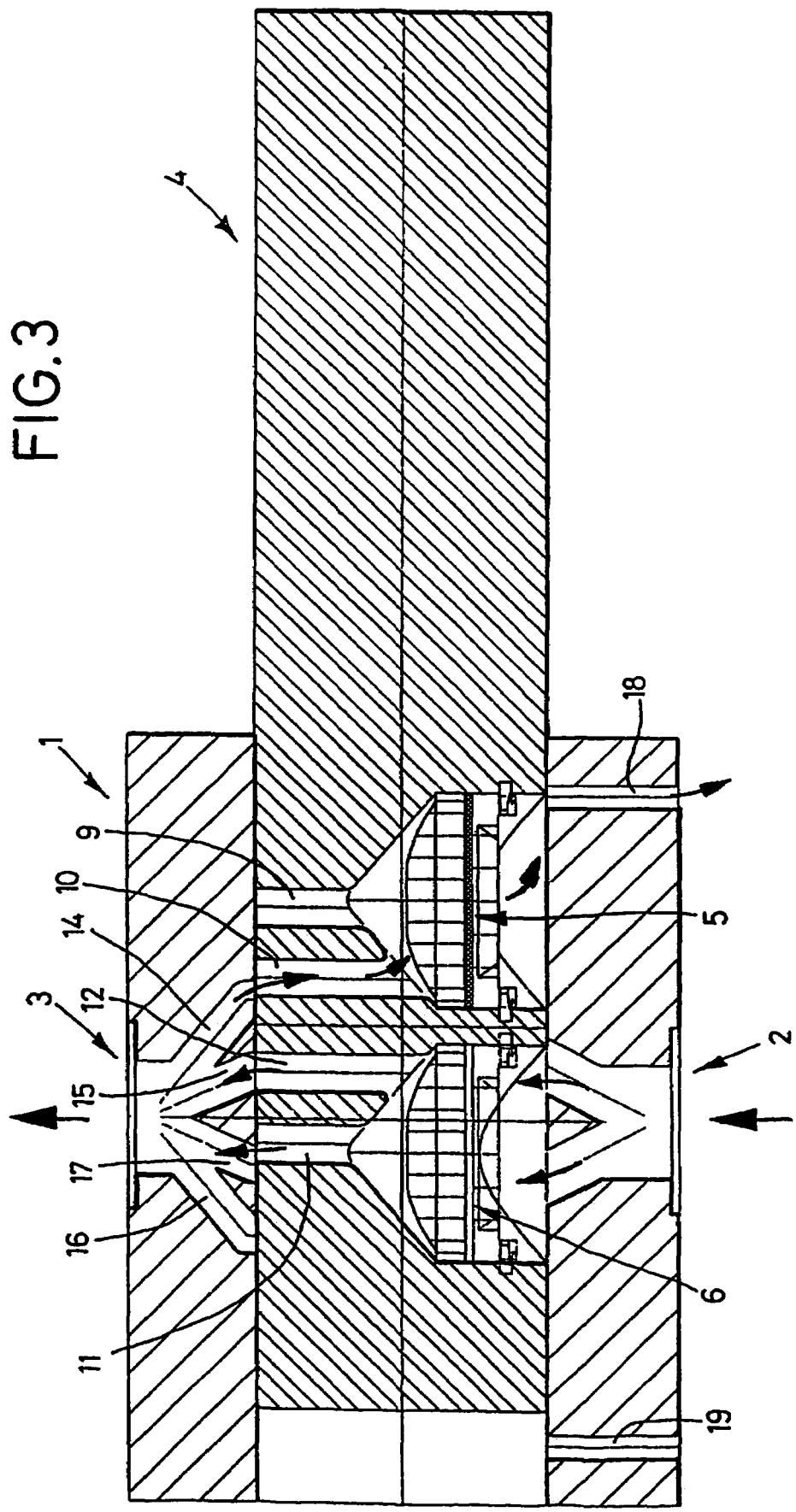

In DE 35 27 173 C1, represented in FIG. 3 is a so-called filter change position, i.e. the actual filter carrier has been pulled far enough out of the housing that the filter can be removed from the filter region and replaced by a new filter. In this so-called filter change position, the second filter housing in the filter carrier continues to operate, and thus makes a connection between the supply channel and the discharge channel. During the process of pulling of the filter carrier far enough out of the housing that the filter change position is achievable, there is an intermediate position in which neither the filter to be replaced nor the filter remaining in the filter carrier is connected to the supply and discharge channels, so that for a more or less long period of time the production by both filter elements is interrupted. This configuration of the filter carrier with its filters causes a brief fluctuation in the process pressure, which fluctuation is disadvantageous for the control parameters of the subsequent units.

If the installations have a very small design, then a relatively quick displacement of the filter carrier can result, i.e. the fluctuation of the process pressure is truly quite brief. If the installations are very large, then a long time is necessary for the displacement of the filter carrier, since a longer path and higher weights must be overcome, and a relatively long fluctuation in the process pressure is thereby produced, which is especially disadvantageous for the resulting unit.

The invention is further based on the problem of creating a device for filtering a fluid, especially for plastic-processing installations, in which the flow of the liquefied plastic from the supply channel to the discharge channel is fully maintained even during the displacement of the filter carrier for the purpose of filter changing, so that a fluctuation of the process pressure is avoided.

This problem forming the basis of the invention is solved through the teaching of the independent claim 10.

Expressed in different words, it is proposed that the outlet channel of each filter region has an elongate form, namely elongate viewed in the direction of the filter carrier or rather the displacement direction of the filter carrier, and that the discharge channel at the filter carrier end, thus directed toward the clean side of the filter, also has an elongate form viewed along the longitudinal axis of the filter carrier, but then tapers in a circular manner toward its free end, and finally the arrangement is made such that the filter regions formed in the filter carrier lie closely enough next to each other in the displacement direction of the filter carrier that during the pushing out of a filter from the housing for the purpose of a filter change, communication is always maintained between the supply channel and discharge channel with the interposition of a filter, since the outlet channel of one or the other filter region always ensures a connection to the discharge channel and furthermore the supply channel to one or the other filter in this case always ensures a connection.

According to an essential feature of the invention, it is further arranged that the supply channel is divided in the housing into two partial supply channels in each case, which lead to the filters. Here, the supply channel could also have an oval design when viewed along the longitudinal axis of the filter carrier, but for flow-technology and manufacturing-technology reasons it is advantageous to create partial supply channels.

As a matter of principle, it should be pointed out that it is absolutely possible to form both the outlet channel and the discharge channel through individual bores arranged in a row, and that it is likewise absolutely within the scope of the invention to develop the supply channel in an add-on part that is connectable to the housing.

It is also possible in this arrangement to provide backflush channels, so that likewise in this arrangement the filter carrier or carriers can be guided into the so-called backflush position, in which the backflushed fluid is then released to the outside.

Figure 2:
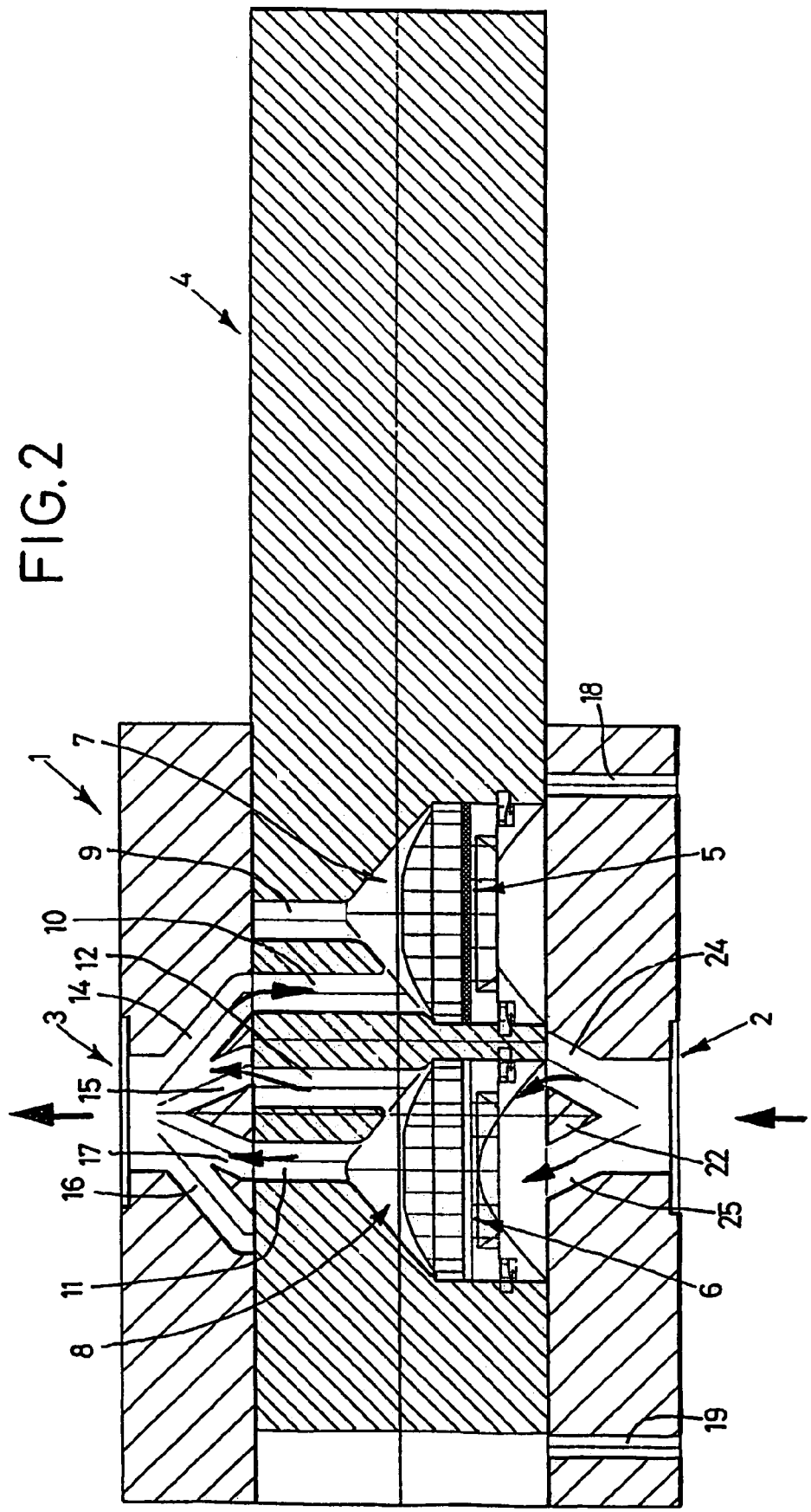
Figure 4:
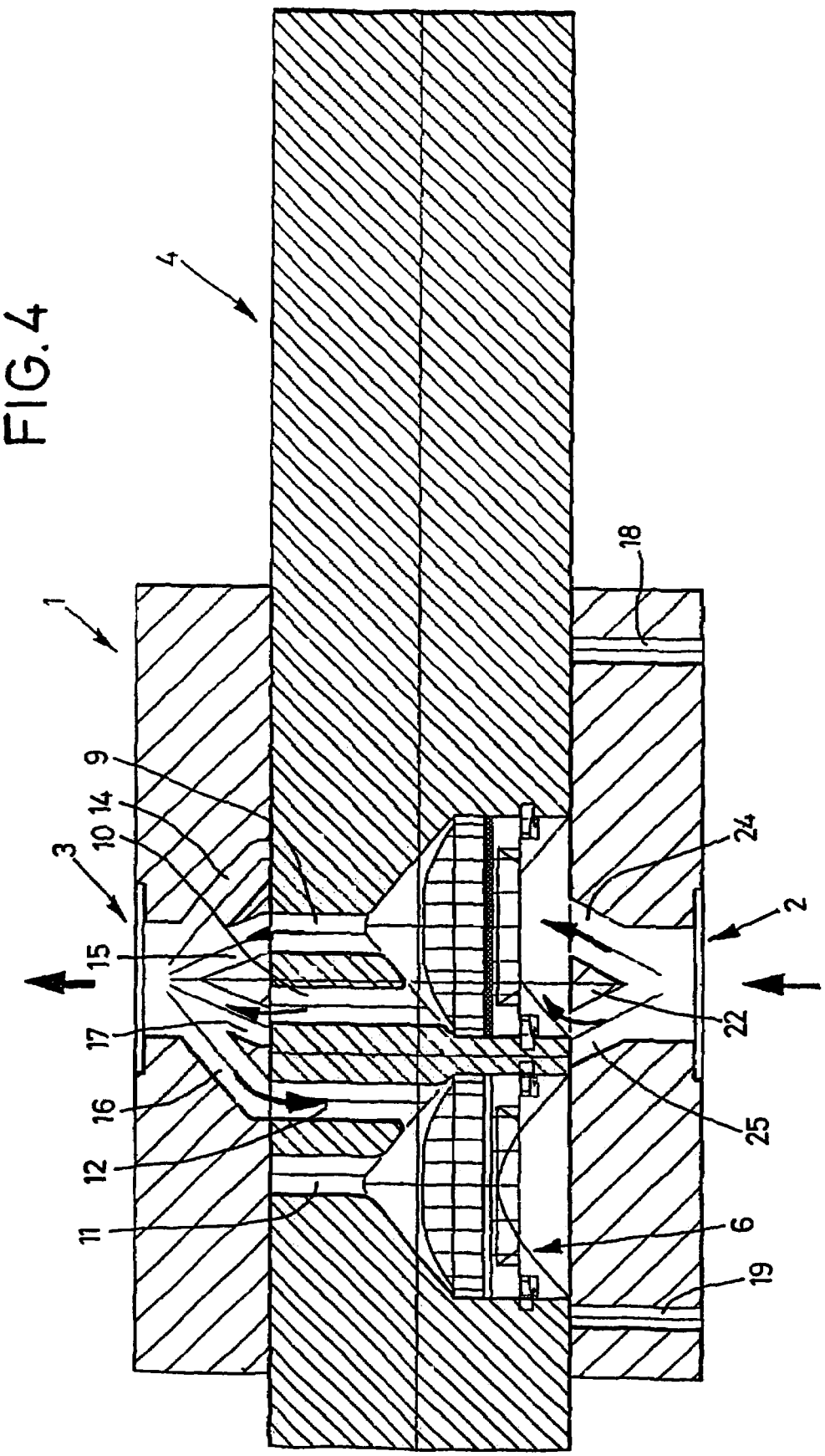
Figure 5:
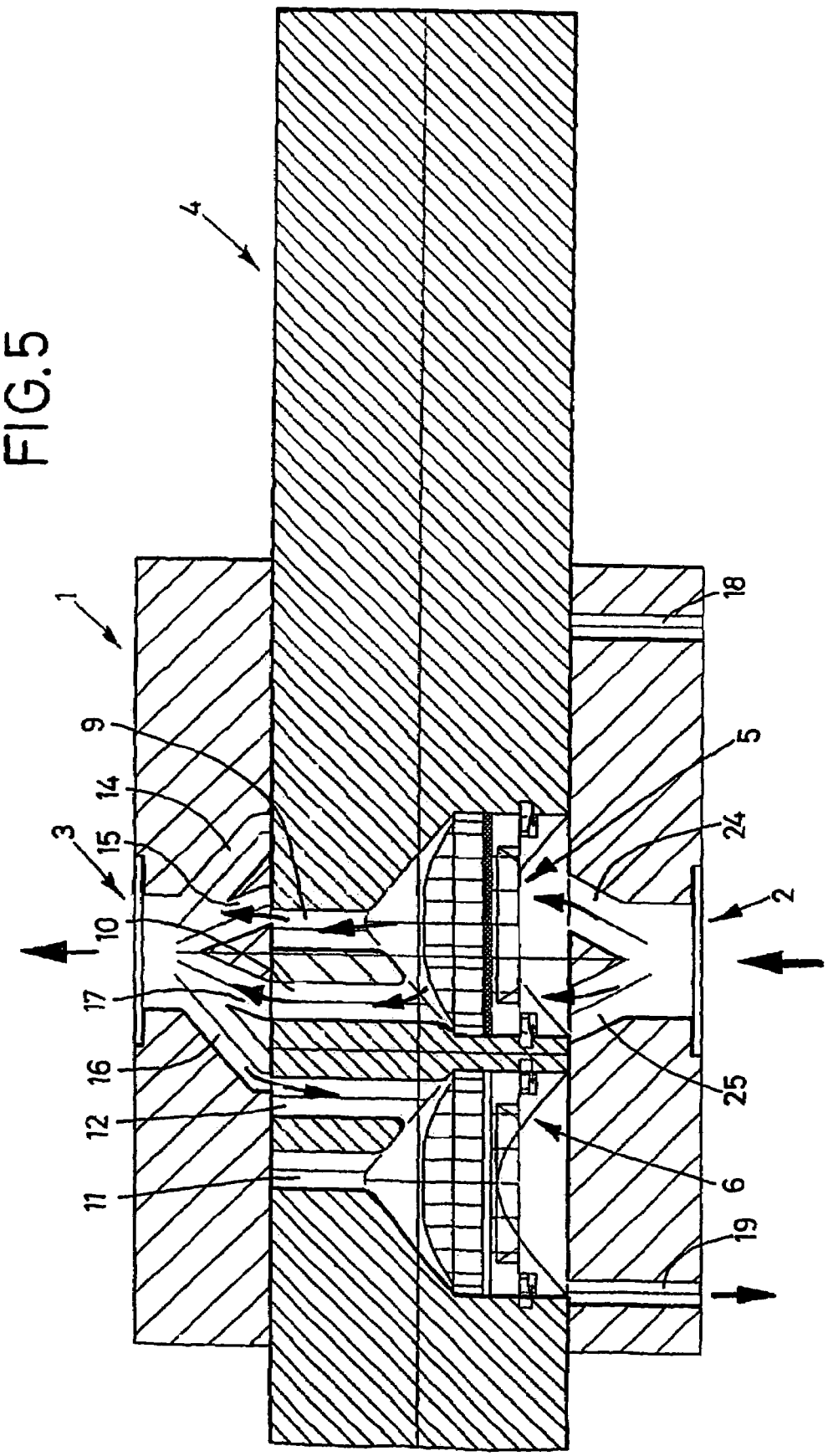
Figure 6:
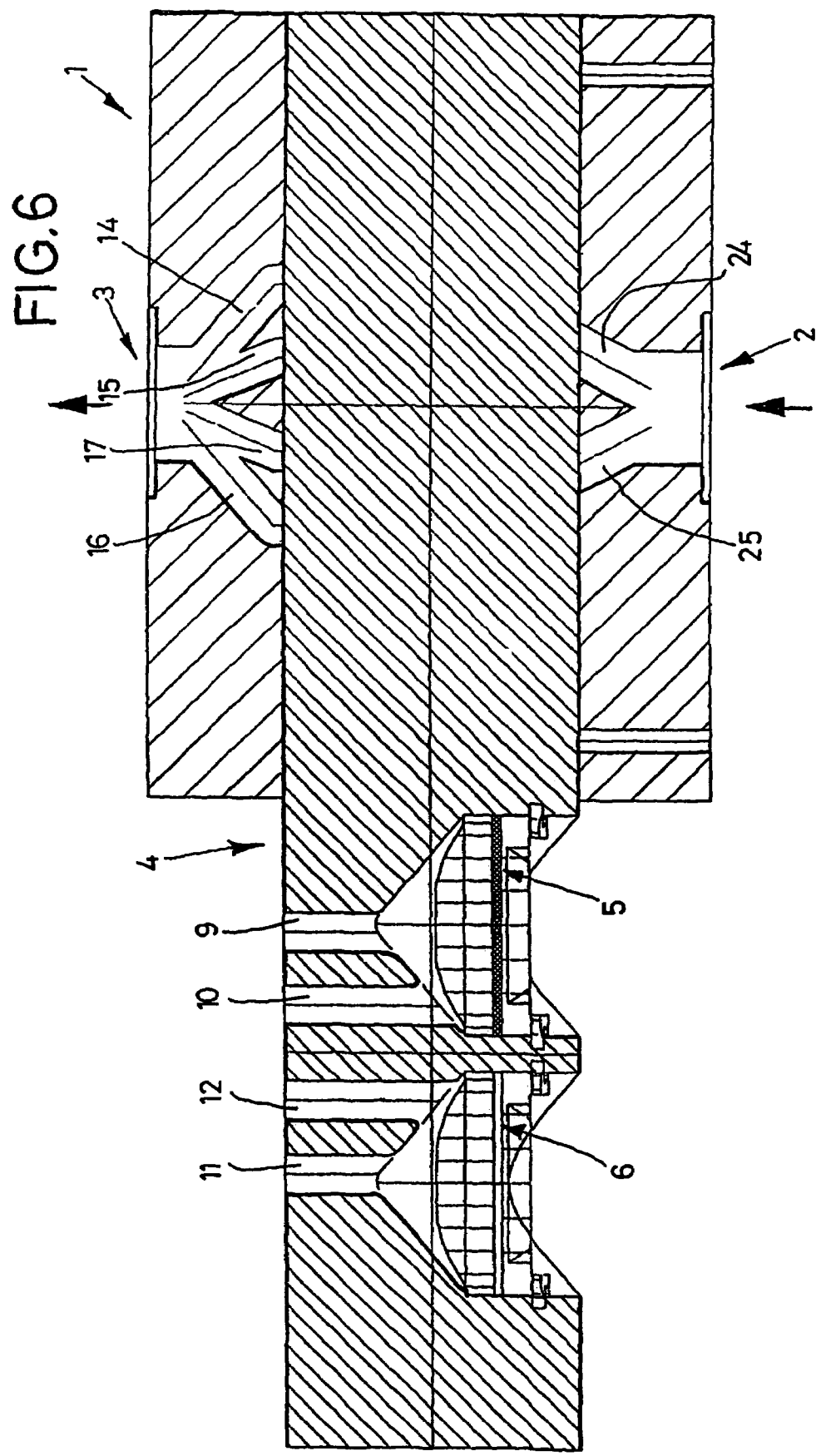
Figure 7:
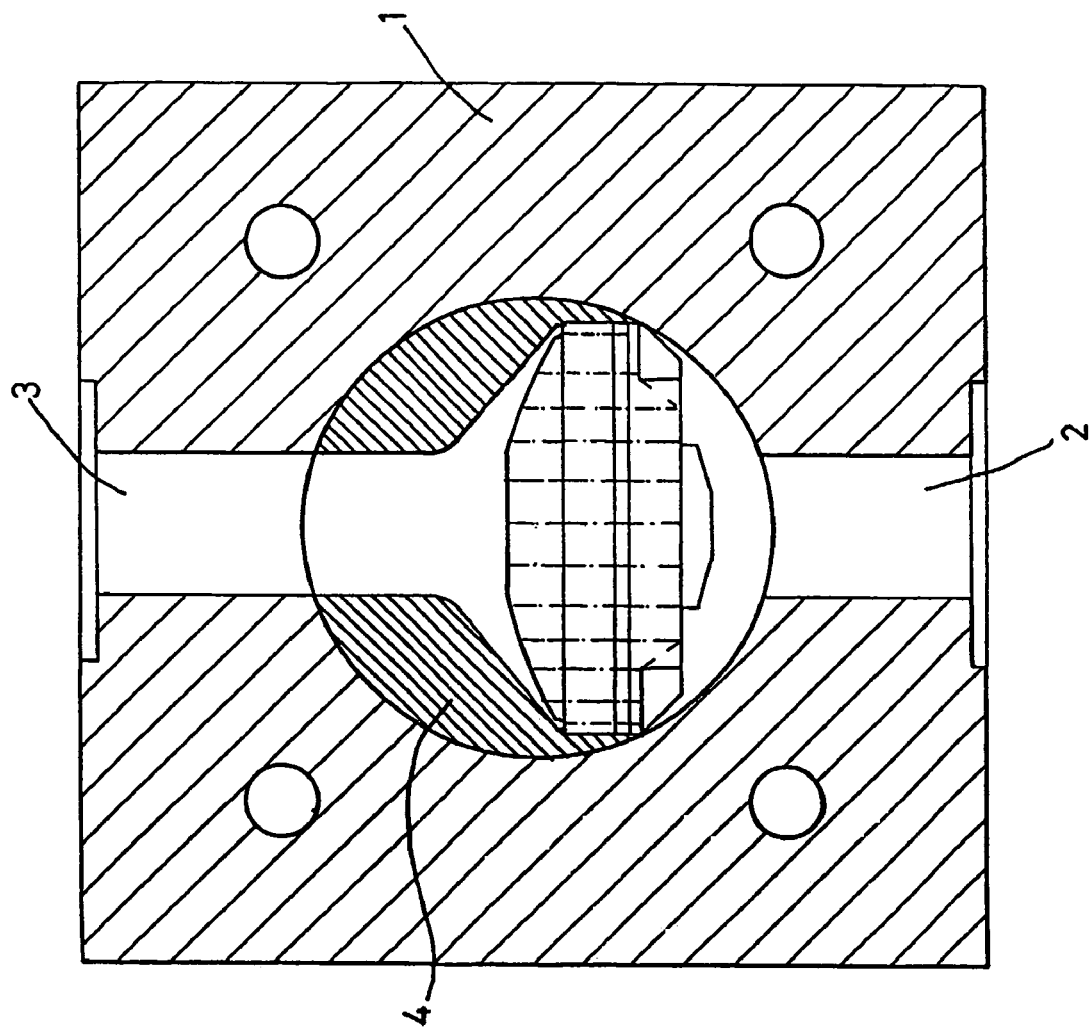
Figure 8:
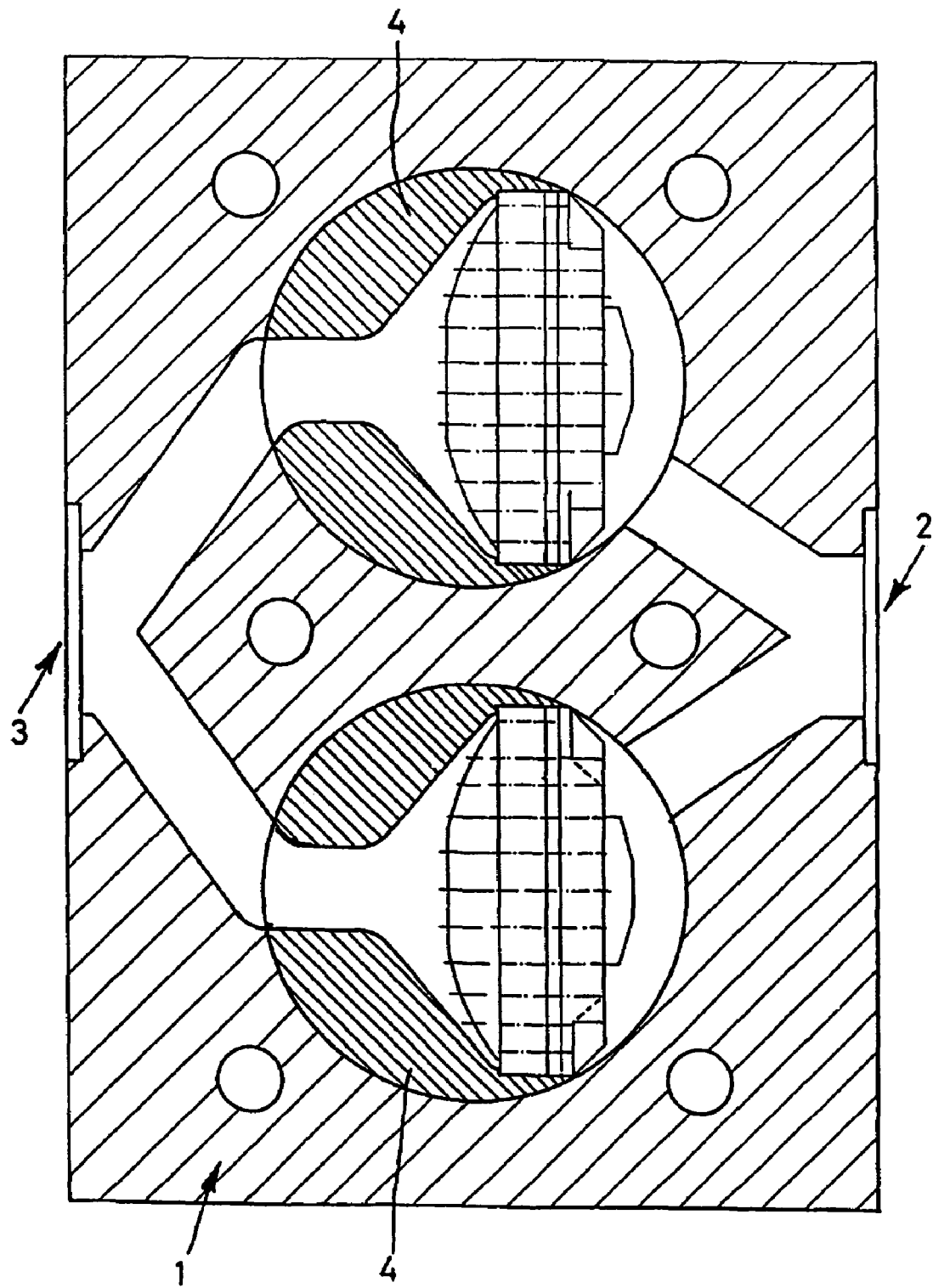
Figure 9:
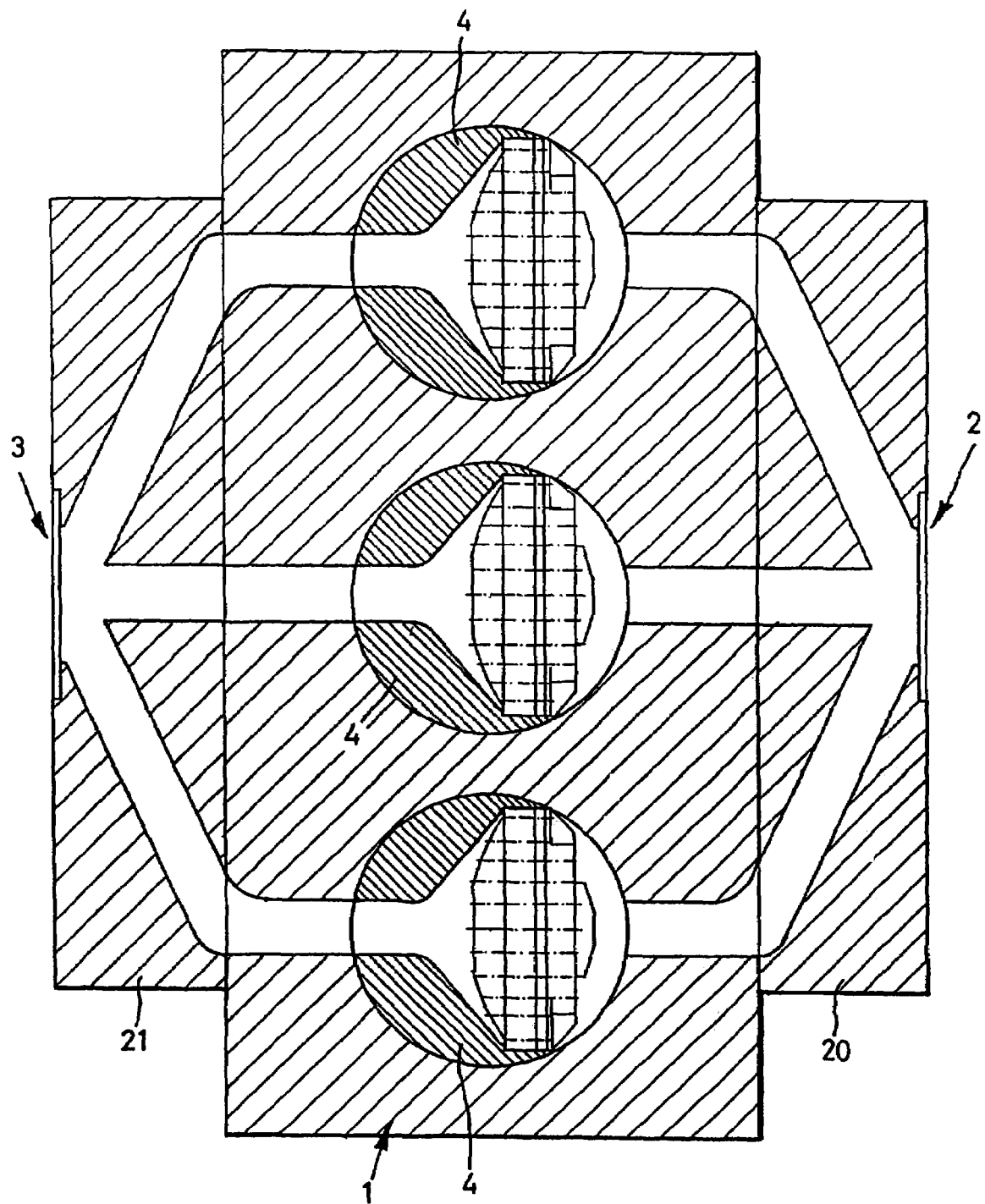
Figure 10:
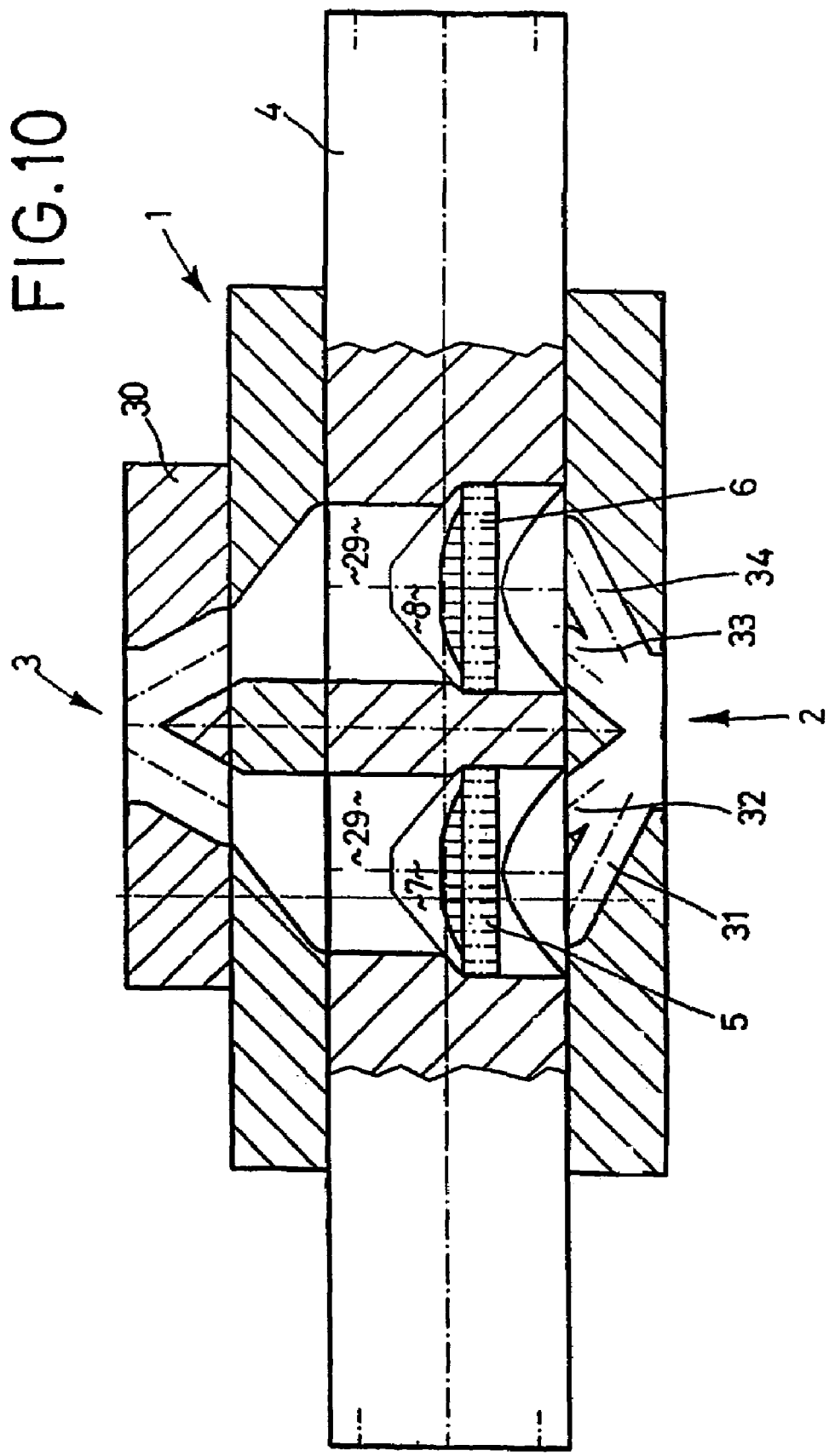
Figure 11:
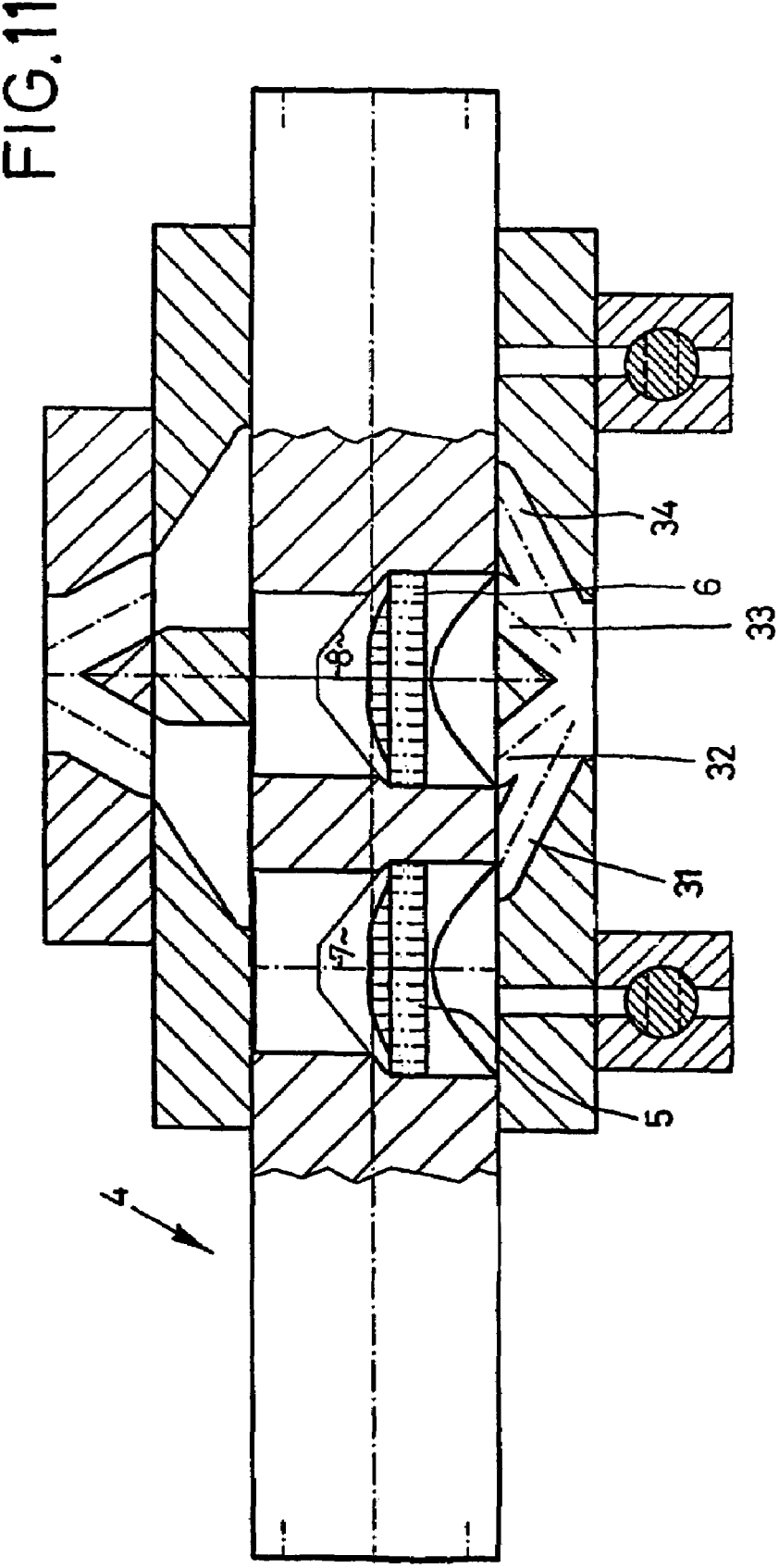
Figure 12:
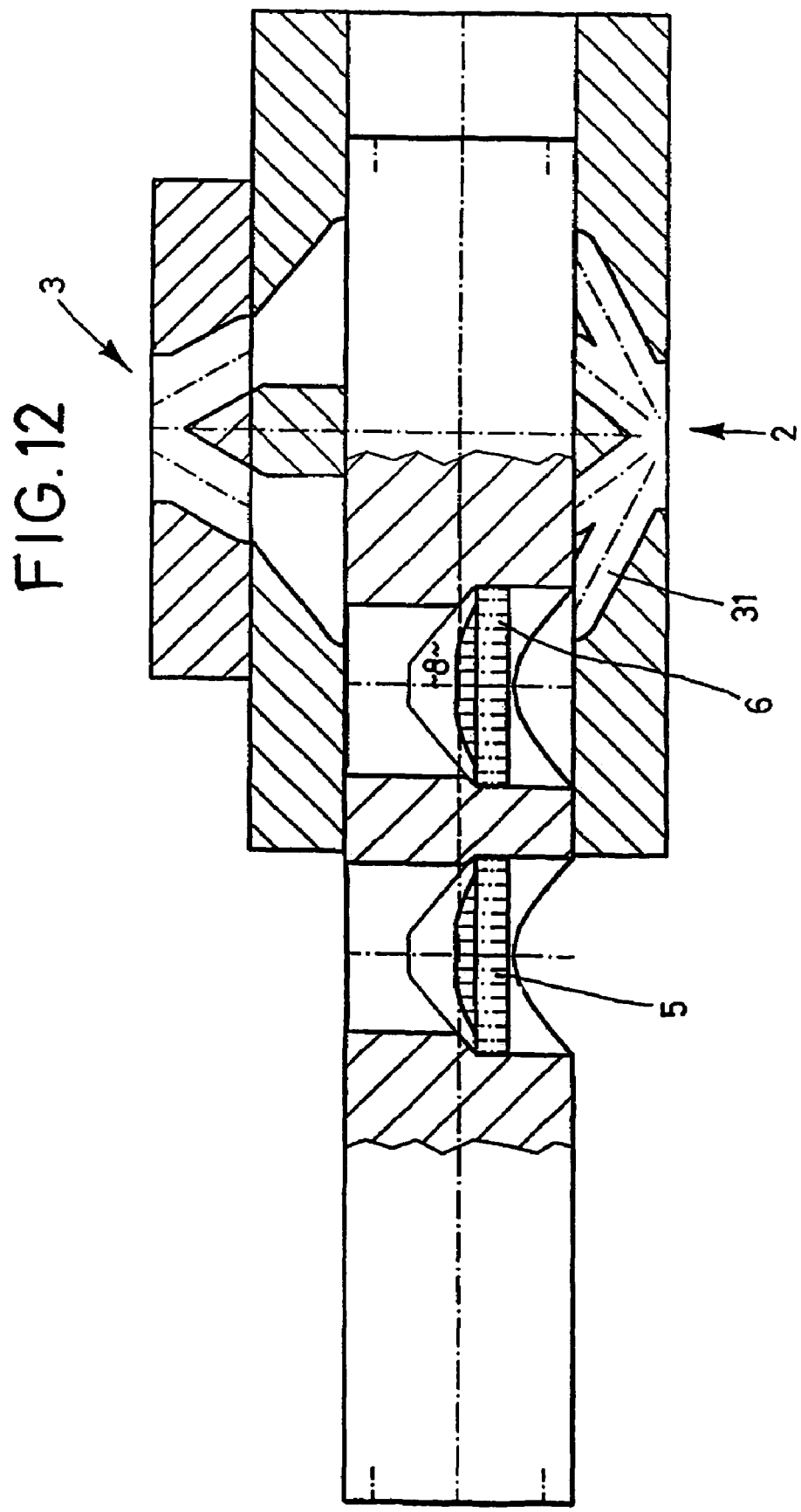
Figure 13:
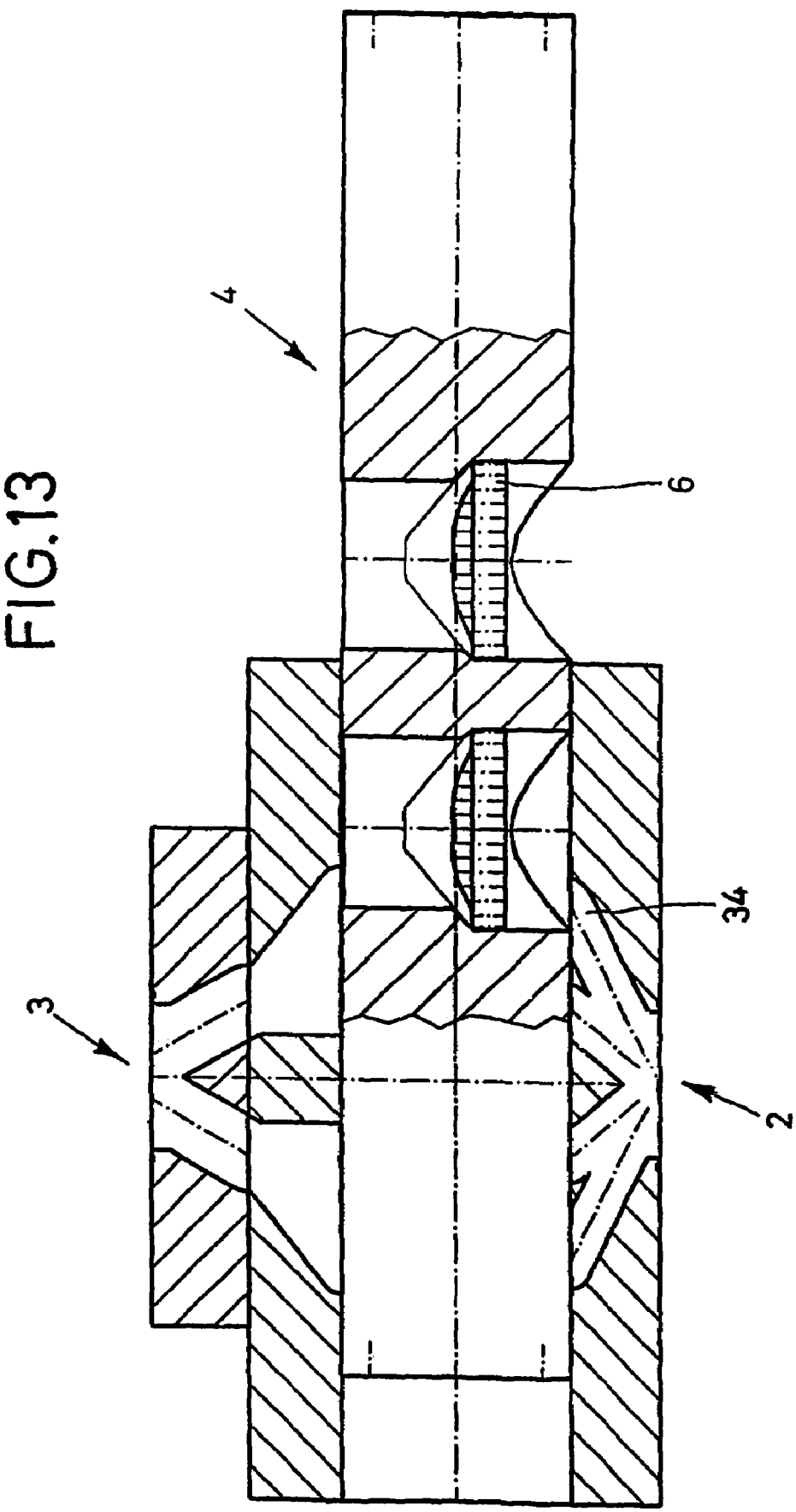

In the following, embodiment examples of the devices according to the invention are explained with reference to the drawings. In the drawings:

FIG. 1 shows an embodiment form with a filter carrier inside a housing in the production position, FIG. 2 shows the arrangement according to FIG. 1 in the so-called blocking position, FIG. 3 shows the arrangement according to FIG. 1 in the so-called backflushing position for one of the two filters, FIG. 4 shows the arrangement according to FIG. 1 in the blocking position for the other filter, FIG. 5 shows the backflushing position of the arrangement according to FIG. 4, FIG. 6 shows the position of the filter carrier according to FIG. 1 in the so-called filter change position, FIG. 7 shows a sectional representation of the device according to FIG. 1 as viewed in the direction of the longitudinal axis of the filter carrier, FIG. 8 shows a sectional representation according to FIG. 7 with two filter carriers arranged one atop the other or side by side, FIG. 9 shows a sectional representation according to FIG. 7 with three filter carriers arranged one atop another or side by side, wherein the housing partial channels and the supply partial channels are provided in separate connection plates, FIG. 10 shows the so-called production position of a modified embodiment form, FIG. 11 shows a selected intermediate position during the moving of the filter carrier according to FIG. 10, said position offering a backflushing possibility, FIG. 12 shows the filter changing of one filter in the embodiment form according to FIG. 10, FIG. 13 shows the filter changing of the other filter in the embodiment form according to FIG. 10, and FIG. 14 shows an arrangement in which two filter carriers are arranged with, in each case, two filters, one atop the other or side by side.

Labeled with 1 in FIG. 1 is a housing that displays a supply channel 2 and a discharge channel 3. Arranged inside the housing is a filter carrier 4 that is displaceable via means, preferably hydraulic, that are not shown in the drawing but belong to the prior art. Arranged in a manner known per se in the filter regions 7 and 8 formed in the filter carrier 4 are filters 5 and 6, said filters 5 and 6, as already explained, likewise being known and consisting essentially of devices that are capable of serving as retaining devices for contaminants.

Through the installation of a flow divider 22, the supply channel 2 is divided into supply partial channels 24 and 25, which make possible the delivery of the fluid to the filter regions 7 and 8.

On the downstream side of the filters 5 and 6, filter-carrier partial channels 9 and 10 for filter region 7 and filter-carrier partial channels 11 and 12 for filter region 8 open into the filter regions 7 and 8, respectively.

In the embodiment form according to FIG. 1, these filter-carrier partial channels 9, 10; 11, 12 lead to housing partial channels 14 and 15, respectively, for filter region 7 or to housing partial channels 16 and 17, respectively, for filter region 8, which partial housing channels are arranged in the housing.

These housing partial channels 14, 15; 16, 17 open into the discharge channel 3, from which fluid filtered or cleansed by the filters 5, 6 can exit.

Formed in the discharge channel 3 is a flow diverter 23, which ensures that no dead space exists in the discharge channel 23[sic], in which dead space filtered fluid could deposit and thus molecularly crack.

In the represented embodiment form, further provided in the housing 1 on the side of the supply channel 2 are two backflush channels 18 and 19, which, as is still to be explained below, can be brought into communication with the filter regions 7, 8 on the upstream side of the filters 5, 6 arranged in these filter regions 7, 8, whereby the device can be used even without the backflushing possibility.

The above explained FIG. 1 of the device shows the so-called production position, i.e. the fluid to be filtered is guided via the supply channel 2 and the supply partial channels 24 and 25 to the upstream side of the filters 5 and 6, is here cleansed of contaminants, via the filter-carrier partial channels 9, 10; 11, 12 enters the housing partial channels 14, 15; 16, 17 associated with these and formed in the housing 1, and from there guided to the discharge channel 3.

If a backflushing of the filter 5 is to take place, according to FIG. 2 the filter carrier 4 is displaced toward the right such that the upstream-side filter region of the filter 5 is blocked, i.e. it communicates with neither the supply partial channel 24 nor the backflush channel 18. However, the downstream side of the filter 5 is connected to the housing partial channel 14 via the filter-carrier partial channel 10, and thus the filter region 7 is pressurized by means of this connection.

If now, as represented in FIG. 3, through a rightward displacement of the filter carrier 4 a connection of the filter region 7 to the backflush channel 18 is established, then a proper backflushing of this filter 5 can be carried out, while simultaneously the production can be maintained through the feeding of the fluid via the supply channel 2 and via the filter 6 to the discharge channel 3.

FIG. 4 shows the blocking position represented in FIG. 2 for filter 5, now for filter 6, while FIG. 5, corresponding to the representation in FIG. 3, shows the production position for filter 5 and the backflushing position for filter 6.

In the representation according to FIG. 6, the filter carrier 4 has been displaced to the left far enough out of the housing 1 that now a filter change of filters 5 and 6 can be carried out without problem.

FIG. 7 shows an arrangement of a filter carrier 4 in a housing 1, corresponding to FIGS. 1 through 6, and FIGS. 8 and 9 illustrate that it is possible to arrange several filter carriers 4 in one housing, so that a continuous production is possible when the filter associated with one of the filter carriers 4 is replaced. Here, FIG. 9 shows that it is possible to form the supply channel 2 and the discharge channel 3, along with the partial supply channels and housing partial channels associated with these channels 2 and 3, in connection plates 20 and 21, which can be attached to the actual housing 1.

In the case of continuous operation with several filter carriers, the blocking of the backflush channels by suitable blocking means is necessary in order to prevent an exiting of the material stream upon the displacement of the filter carrier into the filter change position.

Represented in FIG. 10 is a housing 1 in which a filter carrier 4 is displaceably arranged. The housing 1 displays a supply channel 2 and a discharge channel 3. A fluid, preferably a liquefied plastic, is fed to the supply channel 2 and this fluid can contain contaminants, which are retained by filter elements, hereafter designated filters 5 and 6, that are installed in filter regions 7, 8, so that on the clean side of the filters cleansed fluid can be conducted, in each case via an outlet channel 29, to a discharge channel 3. Subsequent processing units, as for example extruders, injection molding machines, granulators, or the like, can be attached to the discharge channel 3. The discharge channel 3 can here be formed in a connection plate 30.

The supply channel 2, viewed from its entrance, toward the respective filter regions 7, 8 splits into two supply partial channels in each case, 31, 32 and 33, 34 respectively.

In particular, the representation in FIG. 14, in which the filter 5 is removed from a filter carrier 4, shows for the filter region 7 the fact that each filter region tapers to an oval outlet channel 29, the longitudinal axis of this oval extending along the longitudinal axis of the filter carrier 4 and thus having an elongate form.

FIG. 10 shows that the discharge channel 3 also has an elongate form at the filter-carrier side when viewed along the longitudinal axis of the filter carrier 4, but then tapers toward its open end in the manner of a circle, so that, as in the prior art, circular supply pipes for the following units can be connected.

In the representation in FIG. 11 it is evident that the filter carrier 4 has been displaced to the left in order to make available the filter 5 for the filter change. The representation in FIG. 11 also shows that in this intermediate position both the filter region 7 and the filter region 8 are still connected to the supply channel 2, namely via the supply partial channels 31, 32, and 33, while the supply partial channel 34 is closed off by the actual filter carrier 4.

Also upon the further displacement of the filter carrier 4 into the position represented in FIG. 12—thus to the left—the filter 6 with filter region 8 always remains in communication with the supply channel 2 via the supply partial channel 31, so that cleansed fluid continues to be fed to the discharge channel 3.

FIGS. 12 and 13 show the position for the filter change of the filters 5 and 6, respectively, and here too it is observable that now the supply channel 2 is connected to the discharge channel 3 via the supply partial channel 31 or 34, as the case may be.

Achieved through this arrangement is that temporary fluctuations in the process pressure do not occur, which fluctuations could affect negatively the control parameters of the subsequent processing units.

In the case of very large installations, a large, powerful hydraulic system is of course required for the displacement of the filter carrier and nevertheless the displacement time for the filter carrier is relatively long in such large installations. In this connection, achieved through the arrangement according to the invention, especially in the case of large installations, is the fact that a connection can now be continuously maintained between the supply channel 2 and the discharge channel 3 even during a relatively slow displacement of the filter carrier 4.

In summary, it is to be stated that through the arrangement according to the invention new filter changers are created that make available a large filter surface, and this largest-possible filter surface or largest-possible filter diameter is achievable in a smallest-possible filter-carrier diameter. Thereby, not only is the performance of the filter device as a whole increased, but at the same time the material cost is reduced and, simultaneously, the energy expense required to operate this installation is reduced, i.e. the energy for the displacement of the filter carrier and the energy for maintaining the necessary temperatures in the arrangement as a whole. The production of the downstream channels in the filter carrier is relatively simple.

Despite the fact that this arrangement has a small structural size, the cleansing of the individual filters through backflushing is possible without difficulty.

Represented in FIG. 11 is a backflush possibility, namely with backflush channels that are to be opened and closed through blocking devices.

It is to be emphasized that especially essential for the backflushing is the fact that—before the backflushing process begins—the filter to be backflushed can be acted upon with considerable pressure, so that thereby the backflushing process is made substantially easier, quicker, and more effective. At the same time, small displacement movements are achieved, which is likewise significant for the energy expense.

REFERENCE NOTATION LIST 1 housing
2 supply channel
3 discharge channel
4 filter carrier
5 filter
6 filter
7 filter region
8 filter region 9 filter-carrier partial channel
10 filter-carrier partial channel
11 filter-carrier partial channel
12 filter-carrier partial channel
14 housing partial channel
15 housing partial channel
16 housing partial channel
17 housing partial channel
18 backflush channel
19 backflush channel
20 connection plate
21 connection plate
22 flow divider
23 flow divider
24 supply partial channel
25 supply partial channel
29 outlet channel
30 add-on piece
31 supply partial channel
32 supply partial channel
33 supply partial channel
34 supply partial channel

The invention claimed is:

1. A device-for filtering a liquefied plastic comprising:
a housing with at least one supply channel and a discharge channel, wherein the housing defines four housing partial channels, which are in fluid communication with the discharge channel, and two back-flush channels;
a filter carrier moveably mounted in the housing having a first filter region and a second filter region;
at least one filter element arranged in each of the first filter region and second filter region of the filter carrier, wherein the filter elements are perpendicularly disposed to a direction of flow through each of the first filter region and the second filter region;
each of the first filter region and the second filter region being in fluid communication with two filter-carrier partial channels defined by the filter carrier, wherein the filter-carrier partial channels of the filter carrier are in selective fluid communication with the housing partial channels through movement of the filter carrier relative to the housing; and
the filter carrier is selectively moveable to a position wherein the first filter region is in fluid communication with the second filter region through the filter-carrier partial channel and the housing partial channel while fluid communication between the first filter region and the supply channel and at least one of the back-flush channels is blocked.

2. The device according to claim 1, wherein the filter carrier is moveable relative to the housing such that the filter element of the first and second filter regions can be removed.

3. The device according to claim 1, wherein a plurality of filter carriers are arranged in the housing, with each filter carrier being adjacent another filter carrier.

4. The device according to claim 1, wherein the filter carrier is selectively moveable to a back-flush position wherein the second filter region is in fluid communication with the supply channel, two filter-carrier partial channels, two housing partial channels, and the discharge channel, while the first filter region is in fluid communication with the filter-carrier partial channel of the first filter region, the housing partial channel, and the back-flush channel.

5. The device according to claim 1, wherein the supply channel with the supply partial channels and the discharge channel with the housing partial channels are provided in connection plates that are connectable to the housing.

6. The device according to claim 1, wherein a flow divider is disposed in the supply channel before the two filter regions.

7. The device according to claim 1, wherein a flow diverter is disposed in the discharge channel.

8. A device for filtering a liquefied plastic comprising:
a housing with a supply channel and a discharge channel;
a filter carrier moveably mounted in the housing having at least a first filter region and a second filter region, with at least one filter element disposed in each filter region so as to be about perpendicular to a direction of flow through the filter region, wherein the filter regions are disposed in the filter carrier such that during replacement of a filter element, one of the first filter region and the second filter region is in fluid communication with the supply channel and the discharge channel;
each of the first filter region and the second filter region taper to define an outlet channel, which is oriented toward the discharge channel, wherein a longitudinal axis of each outlet channel extends along the lengthwise axis of the filter carrier;
the housing defining four supply partial channels, with two supply partial channels leading to the first filter region and two supply partial channels leading to the second filter region;
the discharge channel having an elongated form at a filter carrier side that tapers toward a round open end; and
back-flush channels and blocking devices for blocking at least one of the back-flush channels.

9. The device according to claim 8, wherein the discharge channel is formed in a connection plate that is connectable to the housing.

10. The device according to claim 8, wherein the outlet channels are formed as individual bores arranged in a row.

11. The device according to claim 8, wherein the discharge channel is formed as individual recesses arranged in a row.

12. The device according to claim 8, wherein the supply channel is formed in a connection plate that is connectable to the housing.

* * * * *